(12) United States Patent
Norem

(10) Patent No.: US 8,506,235 B2
(45) Date of Patent: Aug. 13, 2013

(54) AIR TURBINE STARTER ONE-PIECE AIR EXIT PORT BAFFLE

(75) Inventor: Dean A. Norem, Cherry Valley, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 470 days.

(21) Appl. No.: 12/943,332

(22) Filed: Nov. 10, 2010

(65) Prior Publication Data

US 2012/0114475 A1    May 10, 2012

(51) Int. Cl.
*F01D 21/00* (2006.01)

(52) U.S. Cl.
USPC ............................................ 415/9; 415/121.2

(58) Field of Classification Search
USPC ................... 415/9, 121.1, 121.2, 120, 169.1, 415/182.1, 196, 197, 208.1, 211.2, 220, 224.5, 226; 29/889.2; 72/368, 379.2, 379.6
See application file for complete search history.

(56) References Cited

U.S. PATENT DOCUMENTS

| 6,533,541 | B1 | 3/2003 | Farnsworth et al. |
| 6,623,238 | B2 | 9/2003 | Langston et al. |
| 2008/0295556 | A1* | 12/2008 | Hodgson et al. ............... 72/11.1 |

* cited by examiner

*Primary Examiner* — Edward Look
*Assistant Examiner* — Maxime Adjagbe
(74) *Attorney, Agent, or Firm* — Kinney & Lange, P.A.

(57) ABSTRACT

A one-piece air exit port baffle for containment for an air start turbine includes a circular arc section with a circumferentially corrugated circular arc section and a flange section. The circumferentially corrugated circular arc section has a plurality of openings. The flange section is axially adjacent to the circumferentially corrugated circular arc section and configured for attachment adjacent to an air exit port of an air turbine starter.

20 Claims, 9 Drawing Sheets

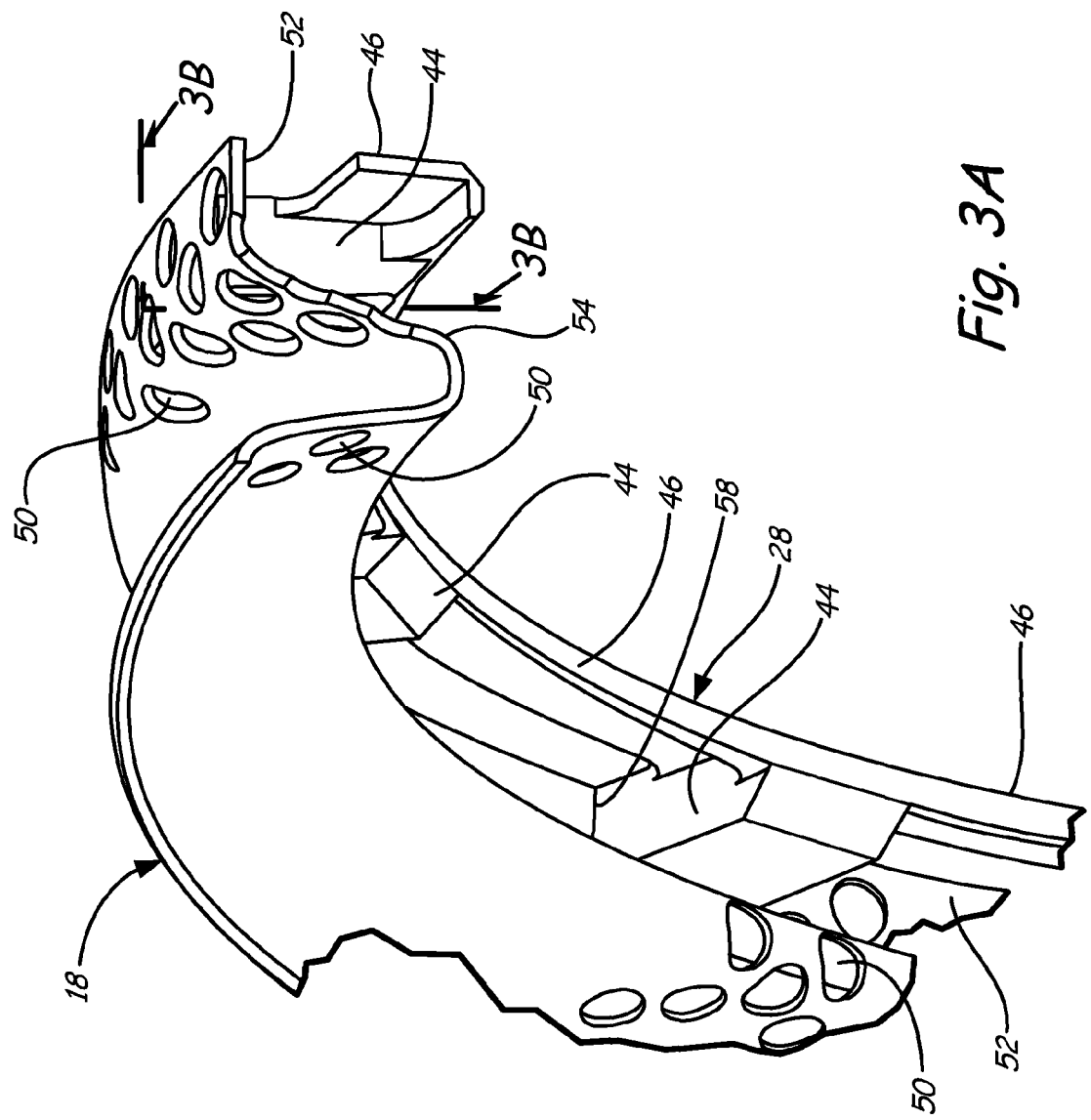

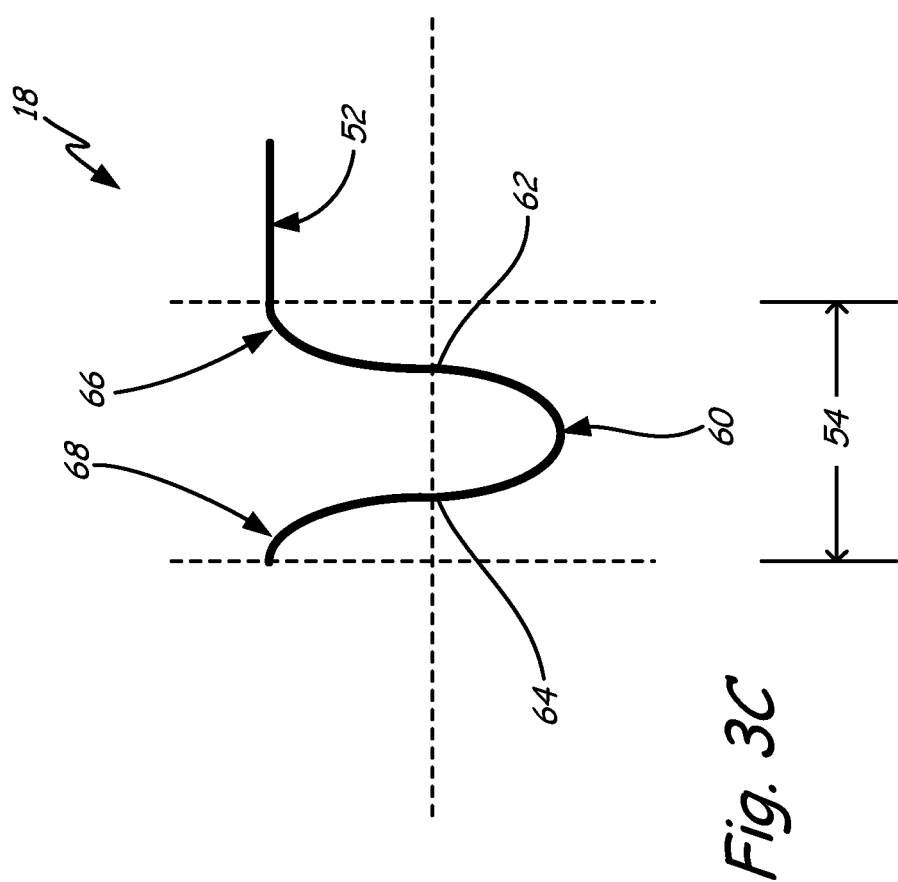

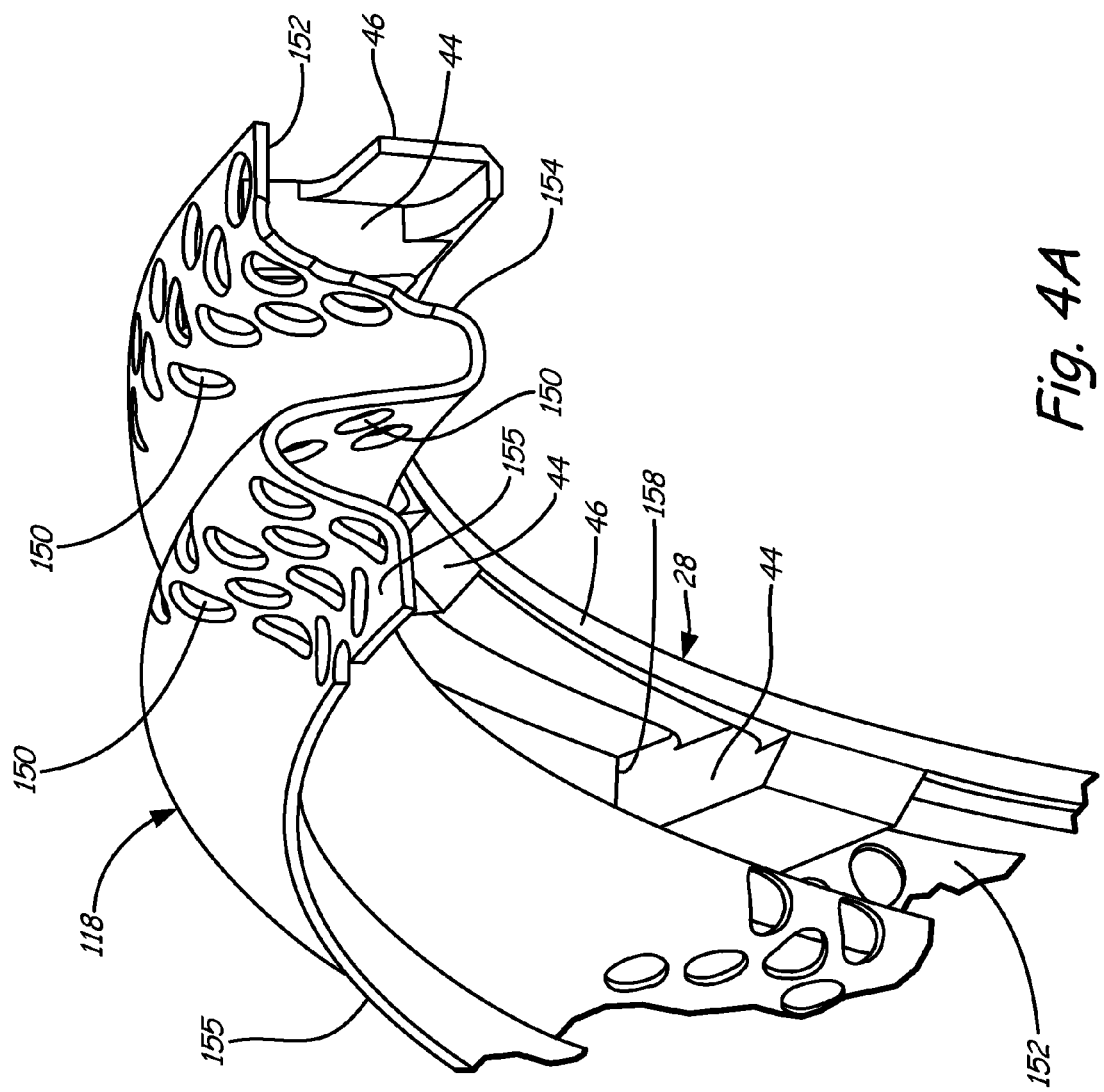

AIR TURBINE STARTER ONE-PIECE AIR EXIT PORT BAFFLE

BACKGROUND

The present invention relates to gas turbine engines. In particular, the invention relates to air exit port containment systems for air turbine starters.

Gas turbine engines require a starter component to rotate the core of the gas turbine to provide sufficient speed and compression to facilitate igniting the engine. An air turbine starter (ATS) is commonly employed in such applications. The ATS is powered by compressed air from an external source. The compressed air passes over blades of an air turbine in the ATS and exits the ATS through an air exit port. As the air turbine rotates, it rotates a shaft connected to the compressor in the gas turbine engine, providing sufficient torque to start the engine.

As with any powerful, high speed rotary system, such as an ATS, there is a risk that internal failure of a component, such as an air turbine, can result in high energy fragments escaping the rotary system and damaging nearby systems. Primary containment systems are employed in positions directly radially outward of rotating components, such as air turbine blades, to prevent large fragments from escaping the system. In the case of an ATS, with its large flow path and volume of compressed air moving past the air turbine blades, it is also possible for midsize and smaller fragments to be carried out of the ATS through an air exit port with sufficient energy to damage nearby components. For example, aircraft often have an ATS physically attached to each engine and proximate fuel pumps, fuel lines, and other important systems. Fragments escaping the ATS through the air exit port have the potential to damage such systems. Generally, an ATS will have a separate containment system, such as a baffle system, positioned at the ATS air exit port to contain such fragments within the ATS or, at least absorb and reduce the kinetic energy of any fragments that do escape through the air exit port.

SUMMARY

The present invention includes a one-piece air exit port baffle for containing or deflecting fragments within an air turbine starter with an annular air exit port. The one-piece baffle includes a circumferentially corrugated circular arc section and a flange section. The circumferentially corrugated circular arc section has a plurality of openings. The flange section is axially adjacent to the circumferentially corrugated circular arc section and configured for attachment adjacent to an air exit port of an air turbine starter.

BRIEF DESCRIPTION OF THE DRAWINGS

FIGS. 3A, 3B, and 3C are perspective and cross-section views of an embodiment of the one-piece air exit port baffle of the present invention.

FIGS. 4A and 4B are perspective and cross-section views of an expanded and tailored embodiment of the one-piece air exit port baffle of the present invention.

DETAILED DESCRIPTION

Conventionally, an ATS exit port baffle comprises series of flat or slightly dished stamped steel rings around the ATS partially covering an annular air exit port. The flat rings are commonly positioned at an angle relative to air exiting the air exit port to inhibit the direct escape of fragments from the ATS through the air exit port. An ATS air exit port baffle must permit air to exit the port as freely as possible to ensure efficient air turbine operation while also inhibiting the escape of fragments in the event of sudden air turbine failure. These requirements are conflicting—the more open the path through the ATS air exit port baffle the more likely fragments may pass thru and not be contained or deflected. An effective ATS air exit port baffle must balance these requirements.

The conventional series of flat rings for an ATS air exit port baffle is comprised of a high number of individual components—baffle rings, spacers between rings, bolts, washers, nuts, etc. It is not uncommon for the part count to reach fifty separate components—all of which must be tracked, counted, inventoried, etc. In addition, assembling such a system is labor intensive. The present invention relieves these problems by replacing the rings, spacers, washers, nuts, etc. with a one-piece baffle. The one-piece baffle has openings to accommodate the air flow needs of the ATS. The one-piece baffle is corrugated to provide the radial strength necessary to inhibit the high energy fragments from escaping the ATS through the air exit port. The baffle has a circular arc section shape to match the annular shape of the air exit port.

Figure 1:
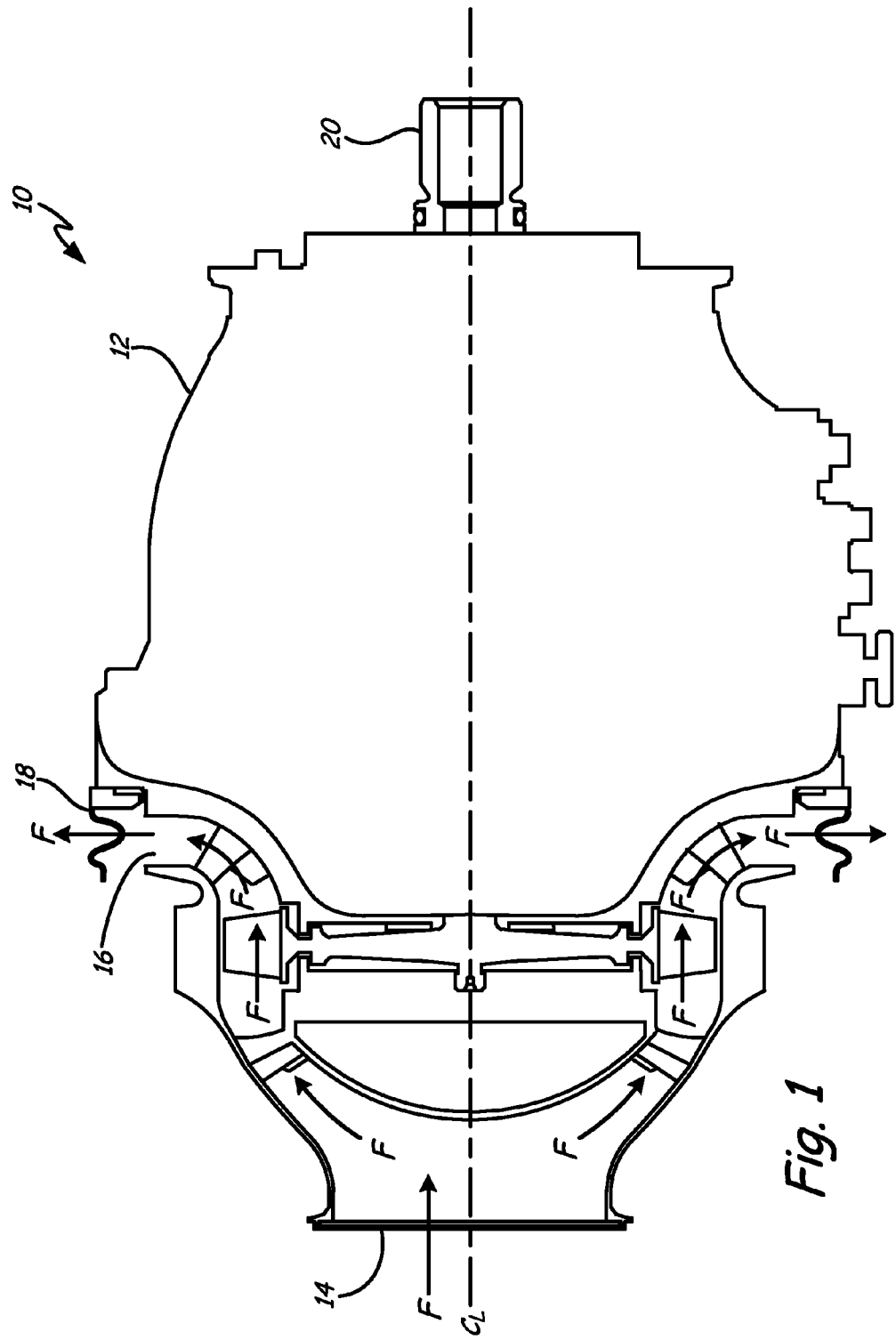
FIG. 1 is a partial cross-section of an air turbine starter illustrating an embodiment of the one-piece air exit port baffle of the present invention.
Figure 2:
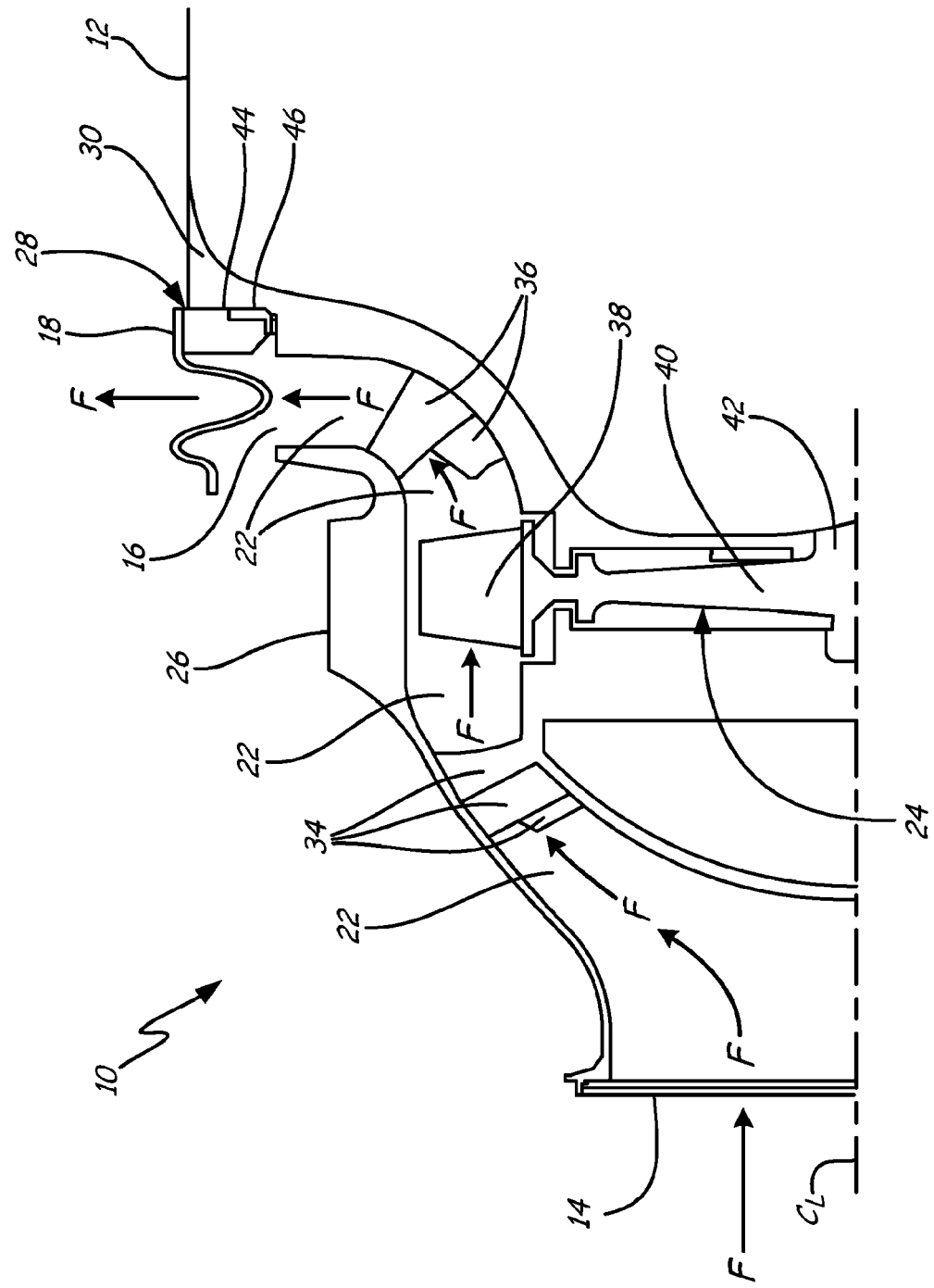
FIG. 2 is an expanded view of the air turbine starter illustrated in FIG. 1 illustrating the embodiment of the one-piece air exit port baffle of the present invention.

Considering FIGS. 1 and 2 together, FIG. 1 is a partial cross-section of an air turbine starter illustrating an embodiment of the one-piece air exit port baffle of the present invention. FIG. 1 shows ATS 10, primary casing 12, air input port 14, annular air exit port 16, air exit port baffle 18, and output power shaft 20. FIG. 2 is an expanded view of a portion of the air turbine starter illustrated in FIG. 1. As shown in FIG. 2, ATS 10 further comprises annular air flow channel 22, air turbine 24, turbine containment system 26, and retaining plate 28, and mid-housing 30. Internal annular air flow channel 22 comprises stator vanes 34 and 36. Air turbine 24 comprises turbine blades 38, turbine wheel hub 40, and turbine shaft 42. Retaining plate 28 comprises attachment block sections 44 and channel sections 46.

Primary casing 12 surrounds the bulk of ATS 10 and attaches to mid-housing 30. Annular air flow channel 22 extends from air input port 14, past stator vanes 34, turbine blades 38, and stator vanes 36 to annular air exit port 16. Turbine blades 38 are attached to turbine wheel hub 40 which is attached to turbine shaft 42. Turbine shaft 42 drives thru a reduction gear train to output shaft 20. Turbine containment system 26 is positioned radially outward from air turbine 24 to prevent the escape of large, high-energy fragments from air turbine 24 in the even of a catastrophic failure of air turbine 24. Attachment block sections 44 are connected by channel sections 46 to form retaining plate 28. Retaining plate 28 is attached to mid-housing 30 at each of attachment block sections 44 by a bolt (not shown) passing from primary casing 12 through mid-housing 30 and terminating in a threaded connection (not shown) in attachment block sections 44. Air exit port baffle 18 is attached to retaining plate 28 at attachment block sections 44 such that it covers annular air exit port 16.

In operation, compressed air enters air input port 14 and flows into annular flow channel 22, past stator vanes 34 which direct the air flow to turbine blades 38. Air flows are indicated by arrows marked F. The air flow continues past stator vanes 36 and out through annular air exit port 16 and air exit port baffle 18. Stator vanes 34 and 36 are positioned to direct air flow past turbine blades 38 to enhance the interaction between the air flow and turbine blades 38 to improve the efficiency of ATS 10. As the compressed air flows past turbine blades 38, the air flow causes turbine wheel hub 40 to rotate about centerline axis $C_L$, rotating turbine shaft 42 and causing rotation in output shaft 20. The rotation of output shaft 20 provides the torque necessary to start an attached engine (not shown).

In the event of catastrophic failure of air turbine 24, air exit port baffle 18 prevents smaller fragments of air turbine 24 that may follow the flow path from exiting annular air exit port 16 from escaping ATS 10. Air exit port baffle 18 provides this protection while still permitting air to exit ATS 10 in an efficient manner.

Figure 3B:
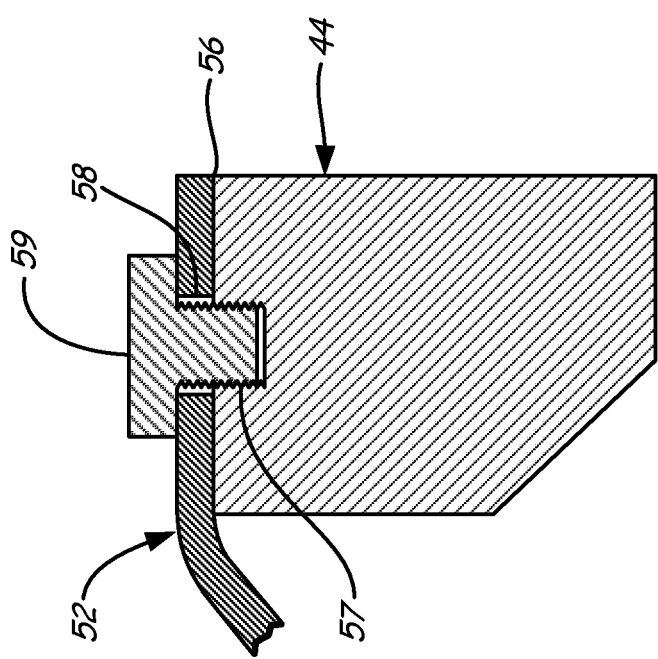

FIGS. 3A, 3B, and 3C are perspective and cross-section views of an embodiment of the one-piece air exit port baffle 18 of the present invention. FIG. 3A is a perspective view of air exit port baffle 18 attached to retaining plate 28 illustrating that air exit port baffle 18 is a one-piece, circular arc section comprising plurality of openings 50, flange section 52 and corrugation 54. Flange section 52 and corrugation 54 run in a circumferential direction, defining a circular arc section. In this embodiment, plurality of openings 50 is a series of perforations or holes through flange section 52 and corrugation 54. As shown in FIG. 3A, air exit port baffle 18 attaches to retaining plate 28 at interface 56 between attachment block sections 44 and flange section 52. The attachment at interface 56 is accomplished by, for example, welding or brazing.

FIG. 3B is a cross-section of a portion of air exit port baffle 18 and attachment block section 44 showing an alternative to welding or brazing for the attachment at interface 56. Alternatively, attachment block section 44 further comprises threaded receiver 57, flange section 52 comprises bolt holes 58 corresponding to attachment block section 44. The attachment at interface 56 is accomplished by inserting threaded fastener 59 through bolt hole 58 and threading threaded fastener 59 into threaded receiver 57. Another alternative for attachment at interface 56 is the combination of welding or brazing with the previously described attachment by threaded fastener 59.

Corrugation 54 of air exit port baffle 18 provides the radial strength needed to prevent fragments from escaping air exit port 16 in addition to increased surface area for plurality of openings 50 for efficient air flow through air exit port baffle 18. FIG. 3C illustrates further details of air exit port baffle 18. FIG. 3C is a cross-section of air exit port baffle 18 illustrating flange section 52 and corrugation 54. Corrugation 54 comprises circumferential valley section 60, first axial edge 62, second axial edge 64, first circumferential peak section 66, and second circumferential peak section 68. Openings 50 are omitted for clarity.

Flange section 52 and corrugation 54 are a one-piece shape that forms air exit port baffle 18. Corrugation 54 has a generally wave-like shape, for example, a sinusoidal wave shape or a triangular wave shape, of about one wave length. Circumferential valley section 60 extends in an inward radial direction, bounded by first axial edge 62 and second axial edge 64. First circumferential peak section 66 is radially and axially adjacent first axial edge 62 and extends away from circumferential valley section 60 in an axial direction and in an increasing radial direction. Similarly, second circumferential peak section 68 is radially and axially adjacent second axial edge 64 and extends away from circumferential valley section 60 in an axial direction opposite that of first circumferential peak section 66 and in an increasing radial direction. Flange section 52 extends in an axial direction away from circumferential valley section 60 and is axially adjacent first circumferential peak section 66 opposite first axial edge 62.

Air exit port baffle 18 is a one-piece baffle replacing the many rings, spacers, washers, nuts, etc. used in the prior art, thus saving costs associated with tracking, counting, and inventorying components. Significant labor savings in assembling and servicing are also realized with air exit port baffle 18. The circular arc section shape of air exit port baffle 18 permits it to be easily attached by welding or brazing to retaining plate 28. Alternatively, by accepting a relatively small increase in components, air exit port baffle 18 is attached to retaining plate 28 by threaded fasteners. Openings 50 are sized and spaced as necessary to achieve the desired air flow through air turbine 24, while limiting the escape of high-energy fragments from ATS 10. Corrugation 54 provides mechanical strength to withstand high-energy impacts and, once impacted, corrugation 54 will tend to compress, closing up plurality of openings 50 to automatically provide additional protection against escaping fragments under conditions where efficient air flow through ATS 10 is no longer a concern. Finally, air exit port baffle 18 provides for safer and more robust handling of ATS 10 by eliminating the rings, which have sharp outer edges and are prone to bending.

Air exit port baffle 18 is made of a material with good formability and ductility, for example, corrosion-resistant steel, to better absorb the energy from high-energy fragments. Air exit port baffle 18 is made by starting with a sheet of such material and forming plurality of openings 50 into the sheet by a process appropriate to the nature of openings 50, for example, punching, drilling, cutting, mill-slotting, and stamping. At the same time, bolt holes, if desired, are also formed. The sheet with plurality of openings 50 undergoes a stamping operation to form corrugation 54 and flange section 52. The corrugated sheet then undergoes a bending or rolling operation to create a circular arc section shape to properly fit over air exit port 16. The processing sequence may be tailored to the equipment and skills of the producer.

Figure 4B:
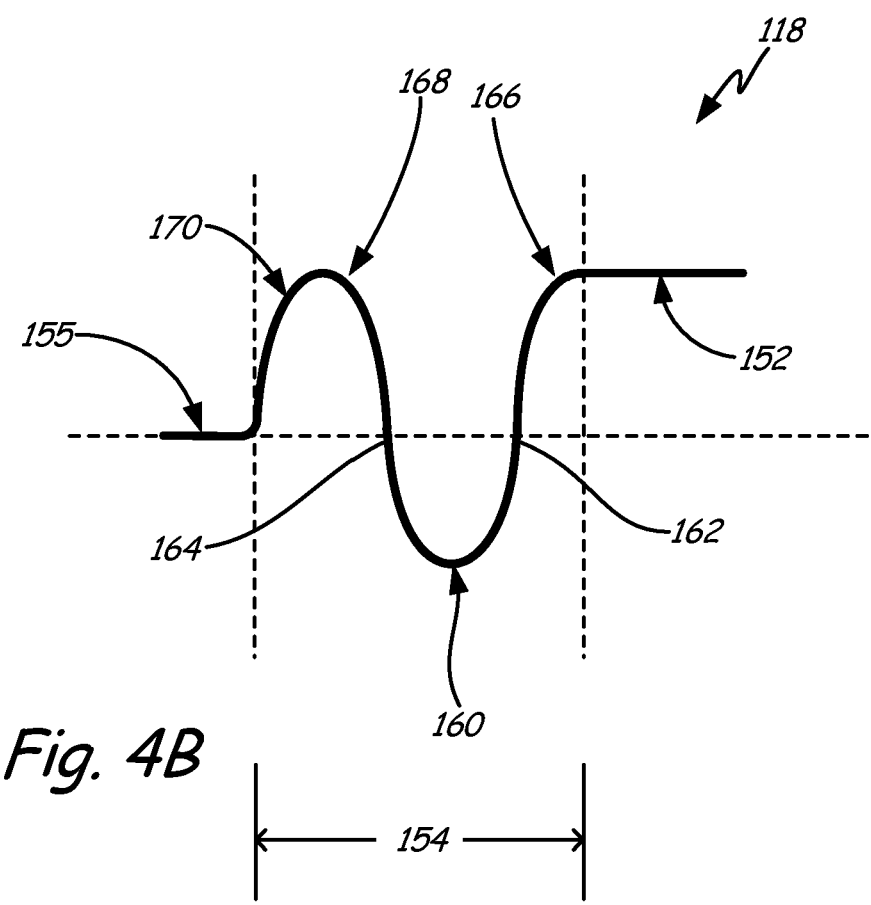

FIGS. 4A and 4B are perspective and cross-section views of another embodiment of the one-piece air exit port baffle of the present invention. FIG. 4A is a perspective view of air exit port baffle 118 attached to retaining plate 28 illustrating that air exit port baffle 118 is a one-piece, circular arc section comprising plurality of openings 150, flange section 152, corrugation 154, and, unlike the previous embodiment, baffle extension section 155. In this embodiment, plurality of openings 150 is a series of perforations or holes through flange section 152, corrugation 154, and baffle extension section 155. As shown in FIG. 4A, air exit port baffle 118 attaches to retaining plate 28 at interface 158 between attachment block sections 44 and flange section 152. The attachment at interface 158 is accomplished by, for example, welding or brazing. Alternatively, the attachment at interface 158 is accomplished by a threaded fastener (not shown) through flange section 152 into attachment block sections 44. As shown in FIG. 4A, flange section 152, corrugation 154, and baffle extension section 155 run in a circumferential direction, defining a circular arc section.

Corrugation 154 of air exit port baffle 118 provides the strength needed to prevent fragments from escaping air exit port 16 in addition to increased surface area for the plurality of openings 150 for efficient air flow through air exit port baffle 118. FIG. 4B illustrates further aspects of air exit port baffle 118. FIG. 4B is a cross-section of air exit port baffle 118 of the present invention illustrating flange section 152, corrugation 154, and baffle extension section 155. Corrugation 154 comprises circumferential valley section 160, first axial edge 162, second axial edge 164, first circumferential peak section 166, second circumferential peak section 168, and, unlike the previous embodiment, third circumferential peak section 170. Openings 150 are omitted for clarity.

Flange section 152, corrugation 154, and baffle extension 155 form a one-piece shape comprising air exit port baffle 118. Corrugation 154 has a generally wave-like shape, for example, a sinusoidal wave shape or a triangular wave shape, of about 1¼ wave lengths. Circumferential valley section 160 extends in an inward radial direction, bounded by first axial edge 162 and second axial edge 164. First circumferential peak section 166 is radially and axially adjacent first axial edge 162 and extends away from circumferential valley section 160 in an axial direction and in an increasing radial direction. Similarly, second circumferential peak section 168 is radially and axially adjacent second axial edge 164 and extends away from circumferential valley section 160 in an axial direction opposite that of first circumferential peak section 166 and in an increasing radial direction. Flange section 152 extends in an axial direction away from circumferential valley section 160 and is axially adjacent first circumferential peak section 166 opposite first axial edge 162. Third circumferential peak section 170 is axially adjacent second circumferential peak section 168 opposite second axial edge 164 and extends away from second circumferential peak section 168 in an axial direction and in a decreasing radial direction. Baffle extension section 155 extends in an axial direction away from circumferential valley section 160 and is axially adjacent third circumferential peak section 170 opposite second circumferential peak section 168.

Air exit port baffle 118 retains all of the advantages described above for the previous embodiment. In addition, air exit port baffle 118, with baffle extension 155 properly positioned by third circumferential peak section 170, provides termination of form, corresponding to adjacent housing features, and provides improved coverage of exit port 16. Finally, because third circumferential peak section 170 turns inward by extending in a decreasing radial direction, it forms a "pocket" to capture debris, further improving the ability of air exit port baffle 118 to contain fragments within ATS 10.

Figure 5:
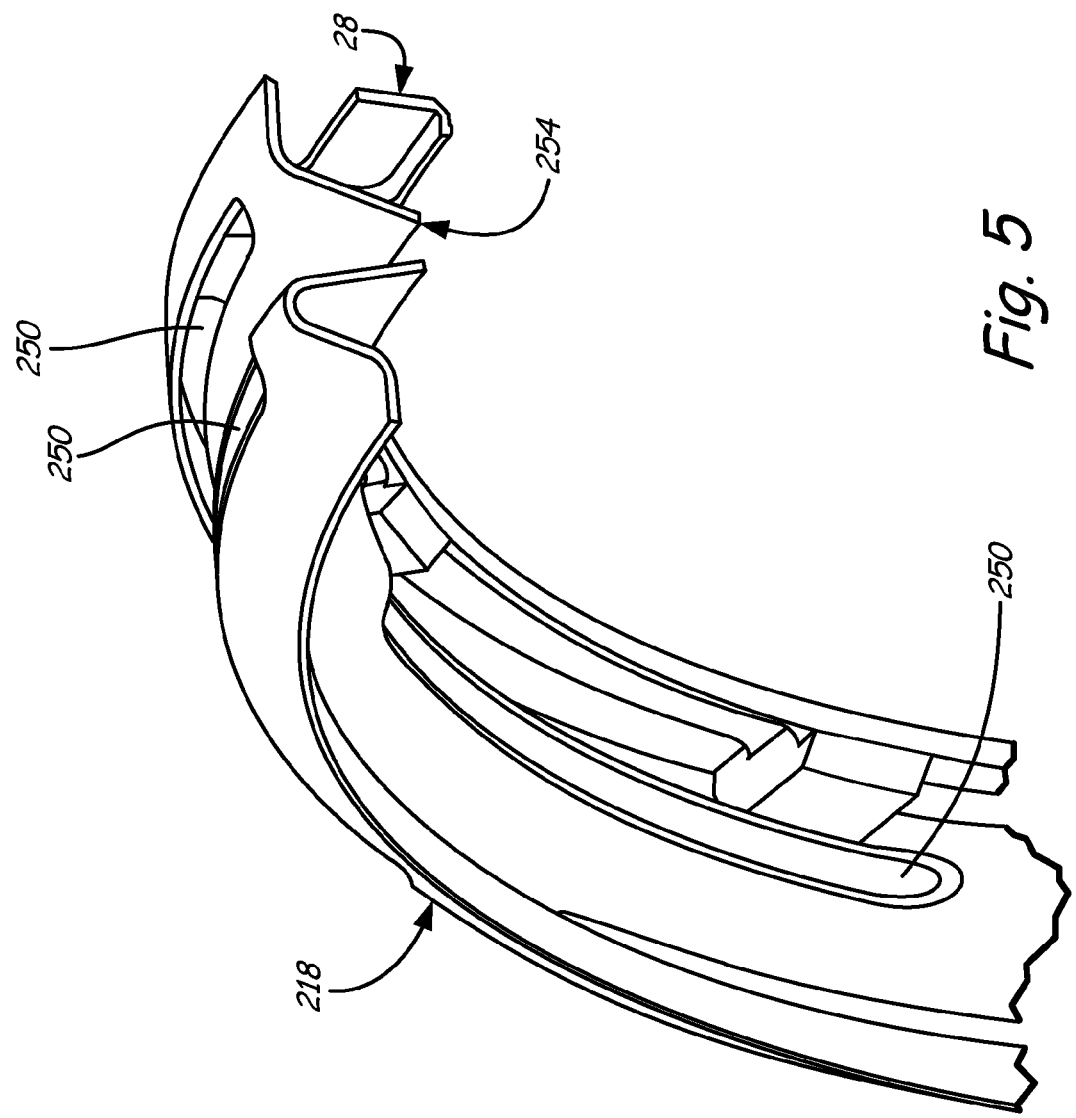
FIG. 5 is a perspective view of another embodiment of the one-piece air exit port baffle of the present invention.

While the previous embodiments employed perforations or holes, other shapes may be employed. FIG. 5 is a perspective view of another embodiment of air exit port baffle 218 of the present invention. Air exit port baffle 218 shown in FIG. 5 is identical to the embodiment discussed in reference to FIGS. 4A and 4B except that plurality of openings 250 is a series of slots cut in corrugation 254.

Figure 6:
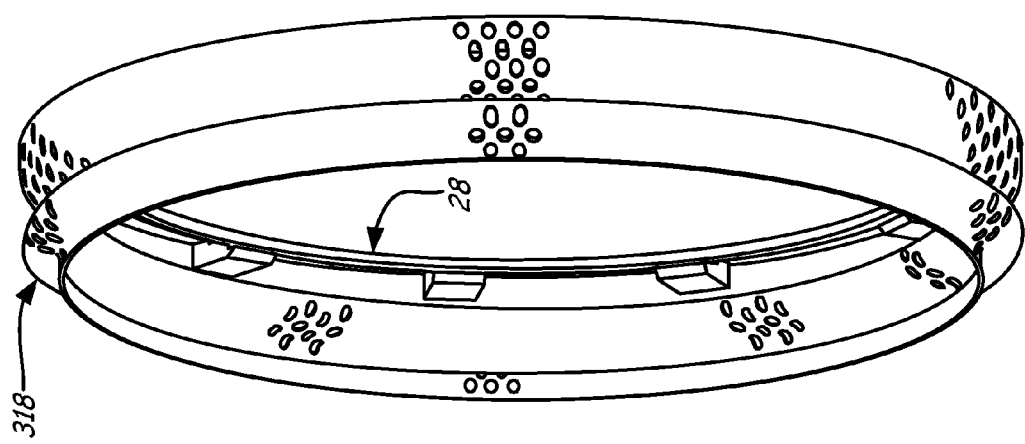
FIG. 6 is a perspective view of another embodiment of the one-piece air exit port baffle of the present invention.

In the previous embodiments, the air exit port baffle is illustrated as a one-piece, circular arc section that is not a complete circle. Multiple air exit port baffles attached to the retaining plate and positioned end to end form a complete circle covering the entirety of the air exit port. FIG. 6 is a perspective view of another embodiment of air exit port baffle 318 of the present invention. Air exit port baffle 318 shown in FIG. 6 is identical to the embodiment discussed in reference to FIGS. 4A and 4B, except that the one-piece, circular arc section forms a complete circle. With this embodiment, air exit port baffle 318 covers the full circumference of air exit port 16.

The embodiments described above employ corrugations of either 1 or 1¼ wave lengths. It is understood that embodiments of the present invention may employ additional whole or fractional wave lengths to extend the corrugation of the one-piece air exit port baffle of the present invention to as many wave lengths as desired to cover an air exit port with a wider axial dimension.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An one-piece air exit port baffle for containing or deflecting fragments within an air turbine starter having an annular air flow channel extending from an air inlet port in a generally axial direction through an air turbine and then in a generally radial direction to an annular air exit port, the one-piece air exit port baffle comprising:
a circumferentially corrugated circular arc section having a plurality of openings therein; and
a flange section axially adjacent to the circumferentially corrugated circular arc section and configured for attachment adjacent to an air exit port of an air turbine starter.

2. The one-piece air exit port baffle of claim 1, wherein the circumferentially corrugated arc section comprises:
a circumferential valley section extending in an inward radial direction and bounded by a first axial edge and a second axial edge;
a first circumferential peak section radially and axially adjacent to the first axial edge and extending away from the circumferential valley section in an axial direction and in an increasing radial direction; and
a second circumferential peak section radially and axially adjacent to the second axial edge and extending away from the circumferential valley section in an axial direction opposite the first circumferential peak and in an increasing radial direction.

3. The one-piece air exit port baffle of claim 2, wherein the flange section attaches to the circumferentially corrugated arc section opposite the first axial edge and extends in an axial direction away from the circumferential valley section.

4. The one-piece air exit port baffle of claim 2, wherein the circumferentially corrugated circular arc section further comprises:
a third circumferential peak section axially adjacent to the second circumferential peak section opposite the second axial edge and extending away from the second circumferential peak section in an axial direction and in a decreasing radial direction; and
a baffle extension section axially adjacent to the third circumferential peak section opposite the second circumferential peak section and extending in an axial direction away from the circumferential valley section.

5. The one-piece air exit port baffle of claim 1, wherein the circumferentially corrugated circular arc section forms a complete circle.

6. The one-piece air exit port baffle of claim 1, wherein the flange section comprises a plurality of bolt holes.

7. The one-piece air exit port baffle of claim 1, wherein the flange section comprises a plurality of openings.

8. The one-piece air exit port baffle of claim 1, wherein the one-piece air exit port baffle is comprised of corrosion-resistant steel.

9. The one-piece air exit port baffle of claim 1, wherein the plurality of openings comprises at least one of perforations and slots.

10. An air turbine starter comprising:
an air inlet port;
an air turbine connected to an output shaft to start an engine;
an annular air flow channel extending from the air inlet port to the air turbine;
an air exit port;
a radial air flow channel extending from the air turbine to the air exit port, wherein air flowing from the air inlet port through the air turbine and out the air exit port provides power for starting the engine; and
a one-piece baffle fixed in position to cover the air exit port to contain fragments within the air turbine starter, the baffle comprising:
   a circumferentially corrugated circular arc section having a plurality of openings therein; and
   a flange section axially adjacent to the circumferentially corrugated circular arc section and configured for attachment to the air turbine adjacent to the air exit port;
wherein the baffle is fixed in position by attachment of the flange section to the air turbine starter.

11. The air turbine starter of claim 10, wherein the circumferentially corrugated arc section comprises:
a circumferential valley section extending in an inward radial direction and bounded by a first axial edge and a second axial edge;
a first circumferential peak section radially and axially adjacent to the first axial edge and extending away from the circumferential valley section in an axial direction and in an increasing radial direction; and
a second circumferential peak section radially and axially adjacent to the second axial edge and extending away from the circumferential valley section in an axial direction opposite the first circumferential peak and in an increasing radial direction.

12. The air turbine starter of claim 11, wherein the flange section attaches to the circumferentially corrugated arc section opposite the first axial edge and extends in an axial direction away from the circumferential valley section.

13. The air turbine starter of claim 11, wherein the circumferentially corrugated circular arc section further comprises:
a third circumferential peak section axially adjacent to the second circumferential peak section opposite the second axial edge and extending away from the second circumferential peak section in an axial direction and in a decreasing radial direction; and
a baffle extension section axially adjacent to the third circumferential peak section opposite the second circumferential peak section and extending in an axial direction away from the circumferential valley section.

14. The air turbine starter of claim 10, wherein the one-piece baffle covers the entire air exit port in the circumferential direction.

15. The air turbine starter of claim 10, wherein the one-piece baffle is fixed in position by at least one of brazing and welding to the air turbine starter.

16. The air turbine starter of claim 10, wherein the one-piece baffle is attached to the air turbine starter by a plurality of threaded fasteners.

17. The air turbine starter of claim 10, wherein the plurality of openings comprises at least one of perforations and slots.

18. A method for manufacturing a one-piece baffle for containing or deflecting fragments within an air turbine starter having an annular air flow channel extending from an air inlet port in a generally axial direction through an air turbine and then in a generally radial direction to an annular air exit port, the method comprising:
forming a plurality of openings in a sheet;
stamping the sheet having the plurality of openings to form a corrugation and a flange; and
bending the stamped sheet into a one-piece circular arc section shape.

19. The method of claim 18, wherein bending the stamped sheet into a one-piece circular arc section shape comprises forming a complete circle.

20. The method of claim 19, wherein stamping the circular arc section shaped sheet comprises:
forming a circumferential valley section extending in an inward radial direction and bounded by a first axial edge and a second axial edge;
forming a first circumferential peak section axially adjacent to the first axial edge and extending away from the circumferential valley section in an axial direction and in an increasing radial direction;
forming a second circumferential peak section axially adjacent to the second axial edge and extending away from the circumferential valley section in an axial direction opposite the first circumferential peak section and in an increasing radial direction; and
forming the flange axially adjacent to the first circumferential peak section opposite the first axial edge and extending in an axial direction away from the circumferential valley section.

* * * * *